United States Patent Office 3,495,902
Patented Feb. 17, 1970

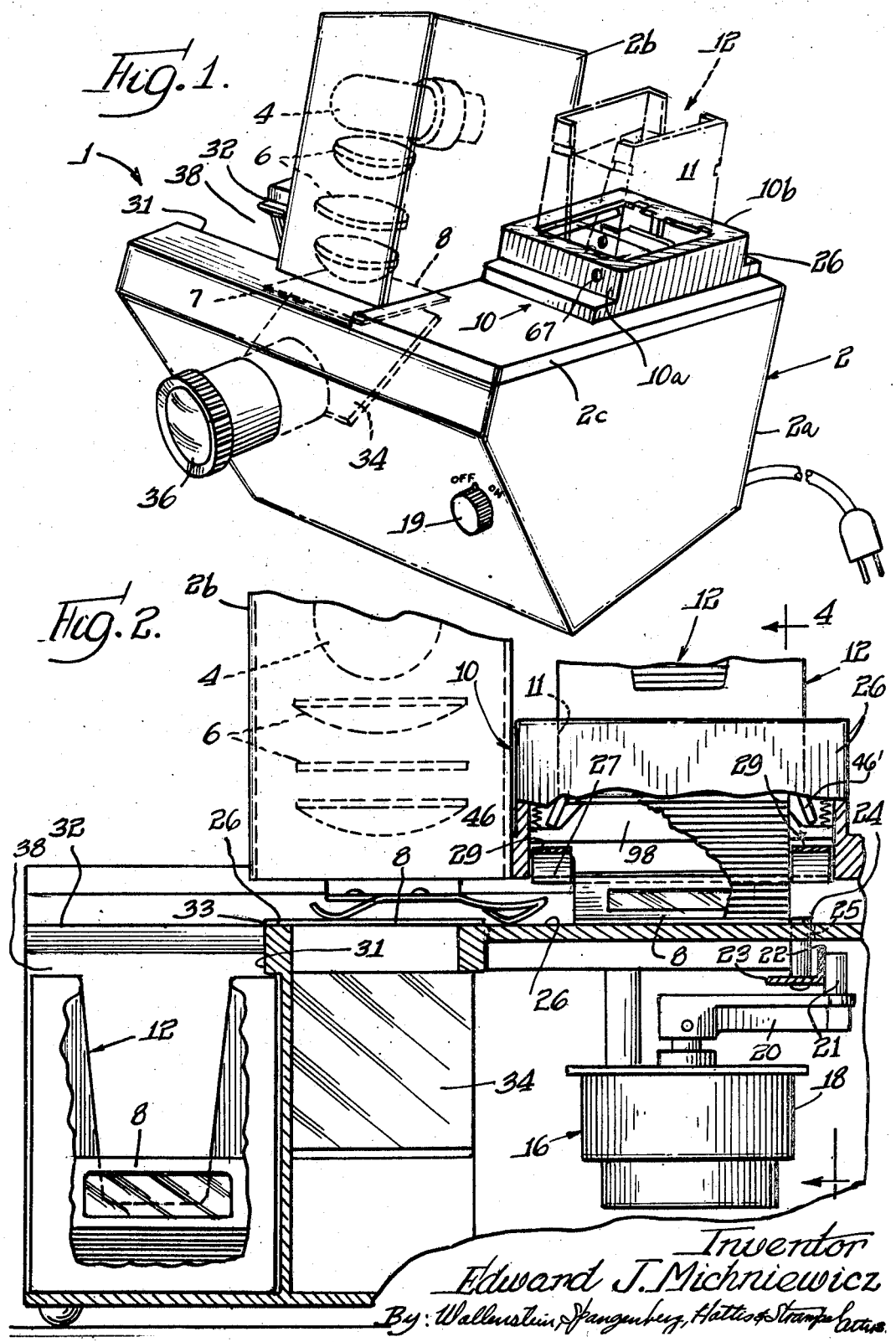

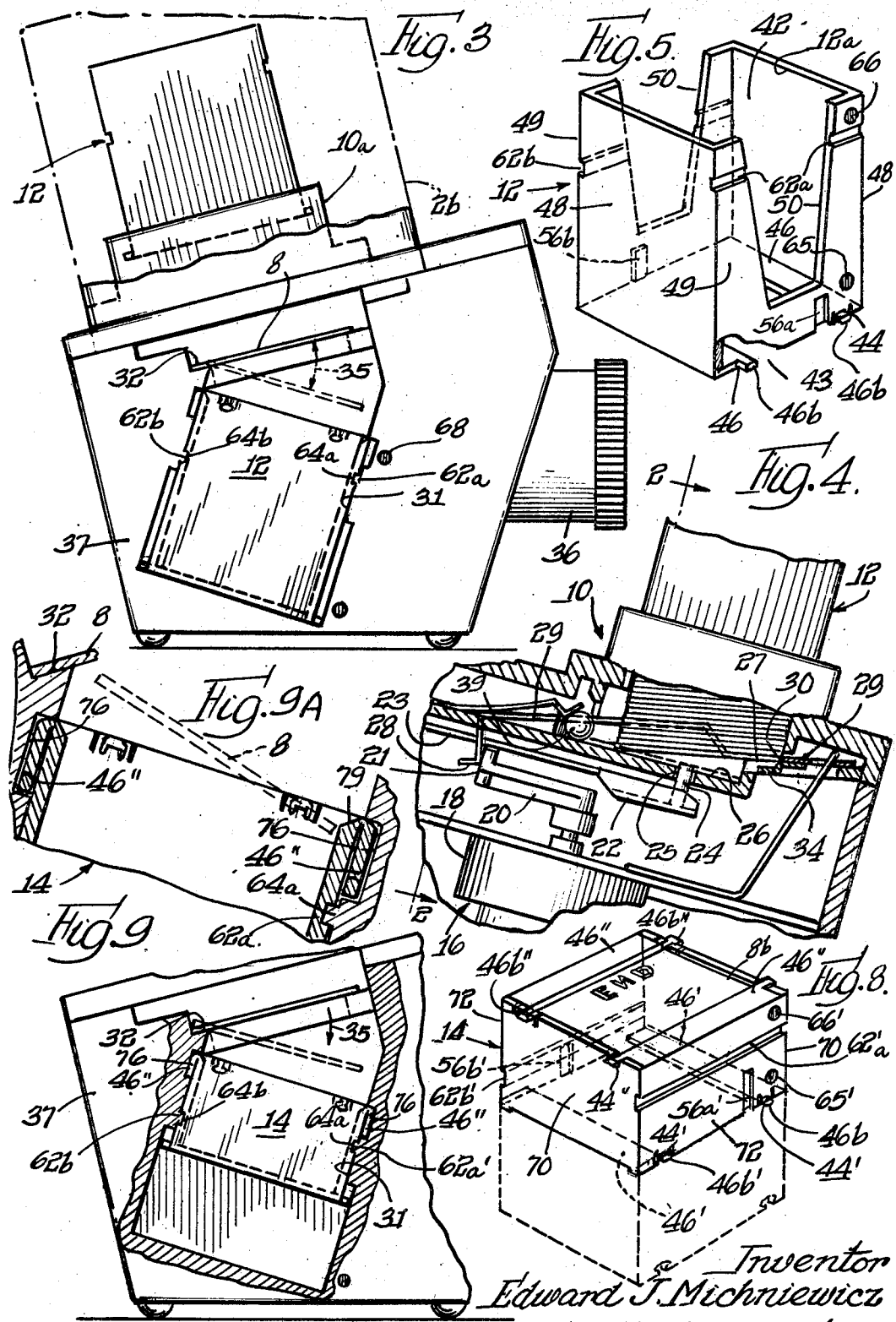

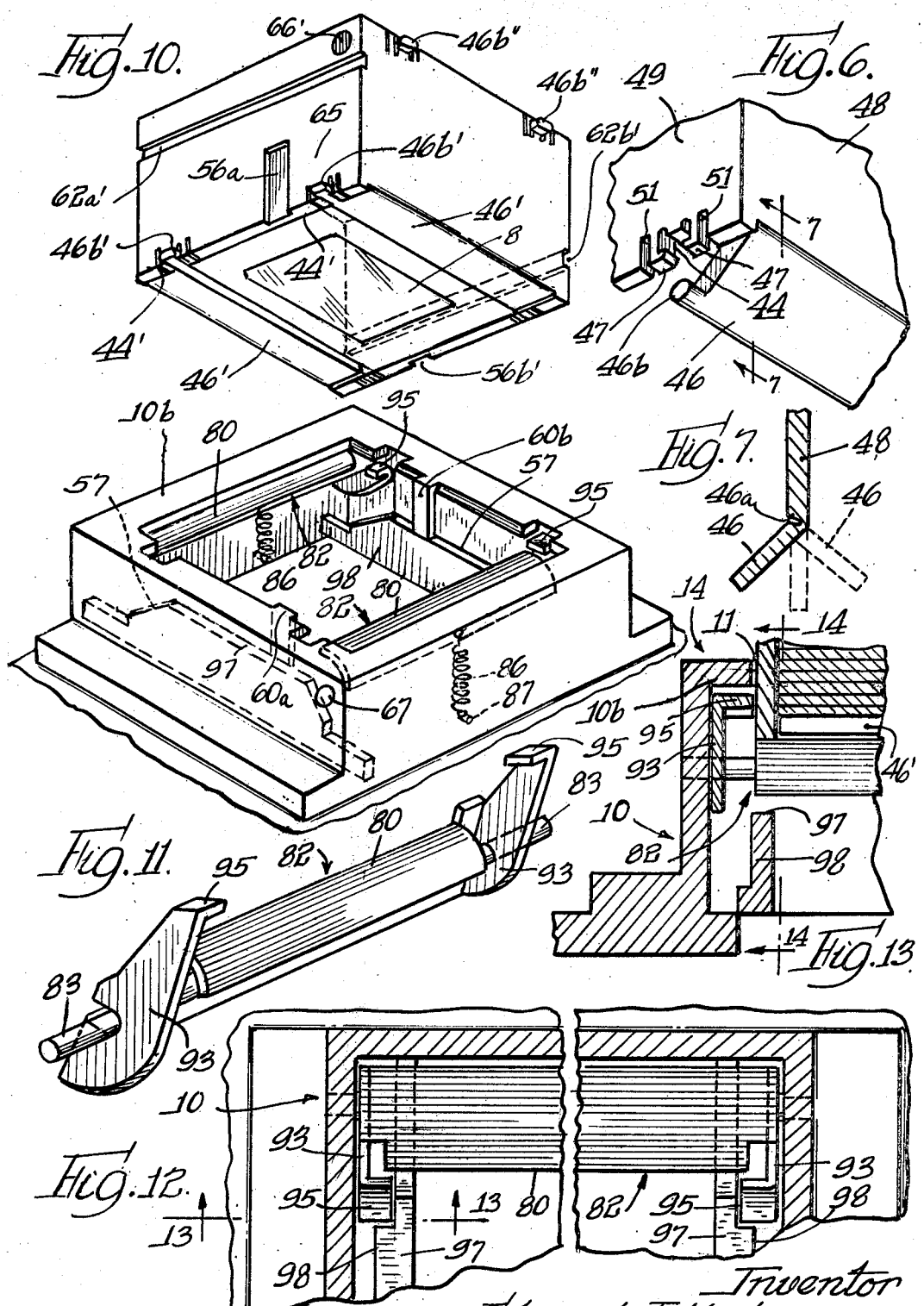

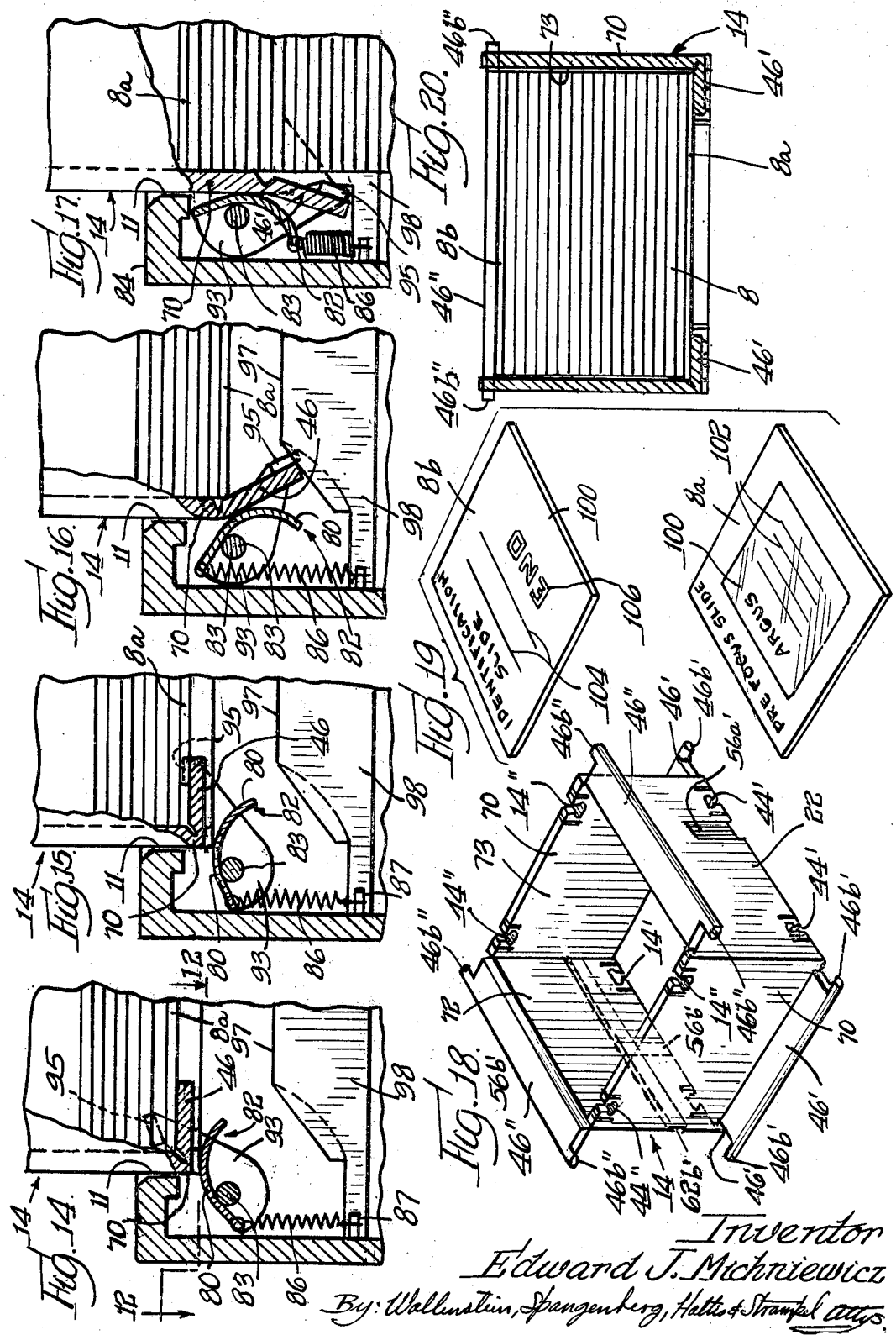

3,495,902
SLIDE TRANSPARENCY CASSETTE AND PROJECTOR FOR RECEIVING THE SAME
Edward J. Michniewicz, Niles, Ill., assignor to Argus Incorporated, Chicago, Ill., a corporation of Delaware
Filed Aug. 15, 1967, Ser. No. 660,737
Int. Cl. G03b 23/00, 23/02
U.S. Cl. 353—112
22 Claims

ABSTRACT OF THE DISCLOSURE

A slide projector is provided having a slide loading opening in the top wall thereof into which a slide transparency holder is positioned, the holder being a rectangular box-like structure having upstanding side walls defining a slide-receiving channel opening onto the top and bottom of the holder and a pair of oppositely disposed slide-retainer flaps hinged to the bottom of the opposite side walls of the holder for movement between transversely inwardly extending positions where the flaps underlie the bottom of the stack of slides in the holder channel and outwardly extending positions where the slides can fall freely under force of gravity from the holder. The projector housing has adjacent the slide loading opening a pair of slide-retainer flap engaging members mounted for pivotal movement on the opposite sides of the opening about pivot axes extending generally parallel to the pivot axes of the holder slide-retainer flaps. The closure flap engaging members have wings which engage extensions of the slide-retainer flaps to pivot the same downwardly and outwardly as the holder is moved downwardly into the slide loading opening of the projector housing.

---

The present invention relates to slide projectors and to a unique slide holding hopper and a cassette in which a film processor places the processed transparency slides for shipment to the customer. The slide holding hopper and cassette are selectively insertable into the projeector housing where they serve either as a slide loading holder or a slide-receiving holder for receiving slides after they are projected.

Processed slides are commonly returned to the customer in cardboard boxes from which the slides are removed for insertion directly into a stack loader of a slide projector or into individual compartments of a partitioned magazine. In the case where the slides are mounted within a stack loader forming part of a slide projector, the slides must be removed from the loader and stored in separate boxes when not in use. The placement of the slides in partitioned magazines is a convenient way for handling and storing the slides, but partitioned magazines are very costly and, due to the partitions in the magazines, are relatively bulky so they require a lot of storage space.

The present invention provides a very inexpensive, compact cassette and hopper for holding slides in face-to-face relation for insertion into a projector and for storing the same. The cassette and hopper are each preferably made as a single piece body of molded synthetic plastic material and preferably includes as an integral molded part thereof one or more slide retainer members which initially underlie the stack of slides therein, and, as the cassette or hopper is fully inserted into the projector of the invention, means therein automatically move the one or more slider retainer members from beneath a slide discharge opening at the bottom thereof so the stack of slides involved drop into the projector housing. The cassette and hopper preferably are designed so that they can be oriented in only one position when they are operatively inserted into a slide loading or slide-receiving station therein, so the slides in the hopper and cassette are always in a proper position to be projected when they are inserted into the loading station.

In the most preferred form of the cassette or hopper, the slide-retainer members thereof comprise a pair of oppositely disposed flaps hinged to the bottom of the cassette or hopper for movement about parallel axes between inwardly transversely extending closed and outwardly extending opened positions. Each slide-retainer flap has a width much less than one-half the width of the opening at the bottom of the cassette or hopper. The cassette has a similar pair of closure flaps hinged to the top of the cassette to partially close off the top of the cassette. A stack of processed slides are packaged in the cassette with a special focusing slide at the bottom of the stack and an exposed identification slide at the top of the stack on which slide the user writes information identifying the stack of slides. The focusing slide and the identification slide also protect the processed slides from dust. The slide-retainer flaps of the cassette and hopper are preferably provided with extensions projecting beyond the side walls thereof, the base portions of which extensions extend into latching slots in the outer edges of the side walls thereof which slots frictionally and releasably hold the closure flaps in their inwardly transversely extending closed position.

The projector designed to receive the cassette and hopper of the invention most advantageously has a slide holder-receiving opening in the top thereof into which the cassette or hopper is positioned by simply moving the cassette or hopper down into the slide holder-receiving opening. The projector includes holder flap engaging means which are contacted by the bottom of the side walls of the cassette or hopper as it is moved down into the slide holder-receiving opening. The holder flap engaging means have extensions or wings which move down upon the flap extensions and pivot the flaps of the cassette or hopper outwardly and downwardly as the cassette or hopper is moved downwardly into the holder-receiving opening.

The above and other advantages and features of the invention will become more apparent upon making reference to the specification to follow, the claims and the drawings wherein:

FIG. 1 is a perspective view of a projector constructed in accordance with the present invention;

FIG. 2 is a longitudinal vertical section through the projector of FIG. 1, taken substantially along section line 2—2 in FIG. 4 and showing slide loading and receiving hoppers constructed in accordance with the present invention inserted therein;

FIG. 3 is an end elevatioal view of the projector shown in FIG. 2 showing the slide-receiving chute with the slide-receiving hopper of the invention therein;

FIG. 4 is a fragmentary vertical sectional view through the slide loading end of the projector taken substantially along section line 4—4 in FIG. 2;

FIG. 5 is a perspective view of one of the hoppers used for loading or receiving projected slides in the projector shown in FIGS. 1 through 3;

FIG. 6 is an enlarged fragmentary view of a bottom corner of the hopper in FIG. 5, showing a slide retainer flap released from the hopper side wall;

FIG. 7 is a sectional view through the portion of the hopper shown in FIG. 6, taken along section line 7—7 thereof;

FIG. 8 is a perspective view of a slide cassette loaded with slide transparencies which cassette is constructed in accordance with the present invention and is usable in place of the slide loading hopper shown in FIGS. 2 and 3;

FIG. 9 is a fragmentary, broken away view of the end portion of the projector shown in FIG. 3 with an empty cassette like the cassette shown in FIG. 8 used as a receiver of projected slides instead of the slide-receiving hopper shown in FIG. 3;

FIG. 9A is a fragmentary vertical sectional view of the top portion of the cassette shown in FIG. 9;

FIG. 10 is a fragmentary perspective view of the slide loading station of the projector of FIGS. 1 through 3 with the slide filled cassette of FIG. 8 being loaded into the slide holder-receiving opening therein;

FIG. 11 is a perspective view of one of the holder slide retainer engaging members at the loading station of the projector which member automatically opens the slide retainer flaps of a slide cassette or hopper positioned within the slide holder-receiving opening of the projector;

FIG. 12 is an enlarged fragmentary horizontal sectional view through the loading station of the projector, taken along section lines 12—12 of FIG. 14;

FIG. 13 is a fragmentary vertical sectional view through the loading station of the projector as a cassette is positioned within the holder-receiving opening thereat, as seen along section line 13—13 in FIG. 12;

FIG. 14 is a vertical sectional view through FIG. 13, taken substantially along the line 14—14 therein;

FIGS. 15 and 16 are views corresponding to FIG. 14 when the cassette has been pressed down varying distances into the projector holder-receiving opening;

FIG. 17 is a view corresponding to FIG. 14 when the cassette has been fully inserted within the projector holder-receiving opening;

FIG. 18 illustrates the orientation of the parts of the cassette of FIG. 8 as it is removed from the mold;

FIG. 19 is a perspective view of the pre-focusing and identification slides placed at the bottom and top of the stack of slides in the cassette of FIG. 8; and FIG. 20 is a vertical sectional view through the cassette of FIG. 8, taken along section line 20—20 thereof.

Refer more particularly to FIGS. 1 and 2, which illustrate a photographic slide projector generally indicated by reference numeral 1. The projector illustrated in FIGS. 1 and 2 is designed for maximum compactness and minimum cost consistent with high quality projection and reliability in operation.

The projector 1 has a housing 2 which may be made of a number of different sections of molded synthetic plastic material. The various sections of the housing shown in FIG. 1 includes a main housing body 2a which houses most of the components of the projector, an open bottom rectangular cover 2b which houses the projection lamp 4 and various condenser lens elements 6 for projecting light through a slide 8 at a slide projection station 7 on the housing body 2a, and a cover 2c having a slide loading station 10 including a slide holder-receiving opening 11 into which an open-top slide loading hopper 12 shown in dashed lines in FIG. 1 and in solid lines in FIG. 4 may be inserted or a cassette 14 like that shown in FIG. 8 may be inserted. The particular manner in which the various sections of the projector housing 2 fit together form no part of the present invention so the details of the housing will not be described except where necessary to explain the features of the exemplary form of the invention to be described. The housing 2 includes slide transporting mechanism 16 (FIGS. 2 and 4) below the loading station 10 which mechanism forms no part of the present invention. The particular mechanism shown in the drawings is disclosed and claimed in copending application Ser. No. 647,425 filed June 20, 1967. Suffice it to say the illustrated slide transporting mechanism 16 includes an electric motor 18 which continuously rotates a crank arm 20 which has a feed pin 21 which engages a flanged portion 22 of a reciprocally mounted slide transport arm 23. The arm 23 has a slide engaging pin 24 which projects through an arcuate opening 25 of a slide track 26 to engage an edge of a slide 8 delivered to the track 26 from the bottom of the stack of slides in the hopper or cassette. The motor 18 is energized by turning a control knob 19 (FIG. 1) on the front of the projector housing 2.

Referring to FIG. 4, when the hopper or the cassette is fully inserted into the holder-receiving opening 11 at the loading station 10, the stack of slides will drop into a position where the rear end portion of the bottommost slide in the stack will be supported on an inclined raised ledge 27 located above the rear end of the slide track 26 and the front end portion of the slide rests on the slide track 26 or a slide resting on the track. During a part of the revolution of the crank arm 20, the feed pin 21 on the crank arm engages an extension 28 on a reciprocally mounted rearwardly spring-urged bifurcated slide feeding member 29 which has a rear slide engaging edge 30 which engages the rear edge of the bottommost slide in the stack and pushes the front edge of the slide already resting on the slide track 26 beneath one or more downwardly spring-urged balls 39 and the back edge of the slide off of the ledge 27 as the slide feeding member 29 is moved forwardly by the pin 21. Where the slides above the bottommost slide in the stack are relatively light cardboard slides, the edge 30 will continue to maintain contact with the bottommost slide until the slide is fully positioned beneath the balls 39 due to a wedging action of the slide between the edge 30 and the bottom of the balls 39. However, where there are many heavy slides, such as glass mounted plastic slides, above the bottommost slide, the weight of these slides may push the bottommost slide below the edge 30 when the rear of the slide clears the ledge 27 before the slide is positioned fully beneath the balls. To prevent the latter situation, a catcher lip 34 is provided which extends from the slide feeding member 29 forwardly and slightly below the edge 30 to form a carrying shoulder for the bottommost slide until the slide is pushed fully beneath the balls 39. The rear of the slide will slip off of the lip 34 to drop upon the slide track 26 when the slide feeding member 29 is allowed to return to its rearwardmost position when the crank arm feed pin 21 leaves contact with the slide feeding member extension 28.

During another part of the rotation of the crank arm 20, the slide transport arm 23 is engaged by the crank arm feed pin 21 and is reciprocated to move the slide engaging pin toward the slide projection station 7 to the slide engaging pin on the track 26 to the projection station. The next slide delivered to the slide projection station by the slide engaging pin 24 will push the slide 8 previously delivered to the projection station 7 to a slide chute 31, along the rear margin of which extends a ledge 32 (FIGS. 1–3). There is no ledge like 32 at the front margin of the slide chute 31, so that the slide involved will lose support when the rear edge of the slide leaves the portion 33 (FIG. 2) on the track 26 at the end of the slide projection station 7 and will fall into the slide chute 31 by pivoting in the direction shown by the arrow 35 in FIG. 3 as it slips off the ledge 32 by force of gravity. The slide-receiving chute 31 opens onto the end wall 37 of the projector housing through a slide holder-receiving opening 38 (FIGS. 1–2) into which an empty hopper or cassette like the hopper 12 or cassette 14 may be inserted into the slide chute to catch the slide dropping into the slide chute.

At the projection station 7 (FIG. 1) light directed from the lamp 4 through the condenser lens system 6 passes through the slides 8 thereat where it is reflected off a mirror 34 into a focusing lens 36 projecting forwardly from the front wall of the housing 2.

The present invention deals with the construction of the hopper 12, the cassette 14 and the portion of the projector which cooperate with the hopper 12 and the cassette 14. As indicated, the hopper 12 and the cassette 14 are each designed to be a holder for slides loaded into the slide holder-receiving opening 11 as well as a receiver for slides delivered to the slide chute 31, and each is provided with slide retainer means to be described which normally retain slides therein, and, when the hopper or cassette is pushed down within the slide holder-receiving opening 11 at the loading station 10, means to be described automatically move the slide retainer means at the bottom of the hopper or cassette to an open position to enable the slides therein to drop into position within the projector housing.

As will be described, the cassette 14 also has slide retainer means at the top thereof so that the slides are prevented from falling from the cassette even when the cassette is inverted in position. Also, the cassette 14 preferably is extremely inexpensive, compact and light-in-weight so that it can be filled with slides by the film processor with little cost and mailed or otherwise delivered to the customer therein for immediate loading into the projector. Before an empty cassette is placed in the slide chute 31, the hopper slide retainer means are moved into an open position to enable slides to drop into the same.

In a manner to be described, the hopper 12 and the cassette 14 are designed so that they can be placed within the slide holder-receiving opening 11 at the loading station 10 or into the slide chute 31 in only one position where the slides therein are always in a proper position to project an upright picture when the receiving hopper or cassette is used as a loading hopper or cassette in the slide holder-receiving opening 11. (When the slides are placed by the film processor or customer in the cassette 14, the slides are so placed therein that they will have a proper orientation to be projected properly in the projector when the cassette is positioned in the holder-receiving opening 11.)

Refer now to FIGS. 5–7 which best illustrate the construction of the slide hopper 12. The hopper 12 is a box-like structure having a fully open top 12a communicating with a vertical slide-receiving channel guideway 42 within the slide transparencies may be stacked in face-to-face relation in planes at right angles to the length of the channel. The channel 42 opens onto the bottom of the box-like structure forming the hopper 12, as indicated by the opening 43 in FIG. 5. The opening 43 is initially partially closed by a pair of slide retainer flaps 46—46 which are hinged to the bottom edges of opposite side walls 48—48. The slide retainer flaps 46—46 are pivotable downwardly and outwardly into a fully open position like that shown in FIG. 7 by dashed lines so that the stack of slides therein can drop through the opening 43 onto the ledge 27 and the slide track 26 as shown in FIG. 4. The slide retainer flaps 46—46 most advantageously are integrally molded parts of the hopper body and are hingedly connected to the hopper side walls 48—48 by thin V-shaped sections or webs 46a—46a of the synthetic plastic material out of which the hopper is molded. Polypropylene is a particularly good material for making the hopper 12 and cassette 14. For reasons to be explained, the hinge axes of the slide retainer flaps 46—46 are located somewhat above the bottom edges of the adjacent hopper side walls 49—49 so the latter side walls project somewhat below the level of the slide retainer flaps 46—46. The slide retainer flaps 46—46 are preferably thinner than the rest of the walls of the hopper so that the inner surfaces thereof are positioned in planes spaced outwardly of the inner surfaces of the hopper side walls when the flaps are pivoted into alignment therewith (see FIG. 7).

Each of the slide retainer flaps 46—46 have elongated or oval-shaped extensions 46b—46b which project axially at the outer end edges thereof beyond the margins of the hopper side walls 49—49 between which the flaps extend. The base portions of the flap extensions 46b—46b are frictionally held within spring latch-forming openings 44—44 (FIG. 6) formed in the bottom edges of the side walls 49—49. Each opening 44 is located between a pair of resilient ears 47—47 defined between the opening 44 and end slits 51—51 cut in the bottom edges of the side walls 49—49.

The hopper side walls 49—49 may be provided with large openings 50—50. Vertical positioning grooves 56a–56b, extending upwardly from the bottom edges of one of the outer sides of the side walls, are provided spaced unequal distances from the same side wall 48 so that the hopper can be passed into the slide holder-receiving opening 11 of the projector loading station in only one orientation of the hopper. As best shown in FIG. 11, the slide holder-receiving opening 11 has a pair of vertical positioning ribs 60a–60b projecting inwardly from opposite sides of the opening 11. The ribs are correspondingly sized and positioned slidably to receive thereover the hopper grooves 56a–56b when the hopper 12 is inserted into the opening 11. The ribs 60a–60b also prevent insertion of the hopper 12 (or cassette 14) in an upside down position within the opening 11. The unequal spacing of the grooves 56a–56b and ribs 60a–60b from the adjacent side of the hopper or opening 11 prevents the hopper from being inserted into the opening 11 when it is rotated 180 degrees from its desired position.

The hopper 12 is also insertable in only one position within the holder-receiving opening 38 of the slide chute 31 by means including complementary horizontally positioning grooves 62a–62b (FIG. 3) formed in the outer surfaces of the opposite side walls 49—49 of the hopper 12 for the full width thereof, and correspondingly spaced ribs 64a–64b formed in the front and rear walls of the chute 31. The hopper slots 62a–62b and slide chute ribs 64a–64b are positioned at different elevations so that the hopper 12 can be inserted into the chute in the only one position thereof where the aforementioned grooves and ribs are aligned.

To avoid the user in determining when the hopper 12 is positioned so that the various above described positioning grooves and ribs are in alignment to permit the hopper to be moved into the slide holder-receiving opening 11 or slide chute opening 38, colored markers like 65 and 66 may be placed near the bottom and top of the forwardly facing hopper side wall 49 respectively to be aligned with a similarly colored marker 67 on the loading station side wall 10a (FIG. 1) and marker 68 on the projector housing end wall 37 near the slide chute 31. Instead of the markers 65, 66, 67 and 68, the adjacently located ends of the positioning grooves and ribs 56a or 56b and 60a or 60b and 62a or 62b and 64a or 64b can be similarly colored.

The cassette 14 illustrated in FIG. 8 is similar to the hopper 12 in most respects (and the similar parts are similarly numbered with a prime added) except as to size and that it has a pair of slide retainer flaps 46″—46″ at the top thereof so that the cassette retains slides therein independently of the orientation of the cassette, wherein the cassette becomes an extremely useful means for shipping or storing the slides as well as a means for loading slides into and receiving projected slides from the projector. The cassette 14 (also shown in FIGS. 18–20) is sized to accommodate the processed slides from a twenty-exposure roll of color film and focusing and identification slides to be described. (The height of the cassette 14 may be increased to the extent indicated in dashed lines in FIG. 8 to accommodate the processed slides from a thirty-six exposure roll or two, twenty-exposure rolls.)

The cassette 14 has a bottom pair of slide retainer flaps 46′—46′ and an upper pair of slide retainer flaps 46″—46″ which are hinged through thin webs or sections of molded synthetic plastic material to the adjacent side walls 70—70 and 72—72 defining an upstanding slide-receiving channel 73 (FIGS. 18 and 20) which opens onto the opposite ends of the cassette body. The flaps 46′—46′ are releasably locked to the adjacent opposite side walls by the entry of flap extensions 46b′—46b′ and 46b″—46b″ into the latching openings 44′—44′ and 44″—44″ formed in the bottom edges of the side walls 72—72 and the top edges of side walls 70—70 and 72—72 of the cassette. The upper and lower pair of slide retainer flaps 46′—46′ and 46″—46″ preferably extend at right angles to each other and thus are hinged to different opposite pairs of cassette side walls.

The above-mentioned right angle relationship between the pairs of flaps 46′—46′ and 46″—46″ best shown in FIG. 18 simplifies the molding of the cassette. Moreover, in the particular design of the projector illustrated in the drawings, the lower pair of slide retainer flaps of the cassette 14 and hopper 12 must extend in the proper direction to catch the slides dropping into the chute 31. Thus, as a slide leaves the slide projection station 7 and slips off the ledge 32, the slide tilts downwardly and forwardly and could fall through the space between the slide retainer flaps of the cassette or hopper involved if the flaps extended parallel to the tilt axis of the slides falling into the chute 31. As illustrated, the bottom slide retainer flaps of the cassette and hopper extend transversely to the tilt axis of the slides so the slides will always strike the flaps in the bottom thereof.

There is provided in the bottom portion of the outer surfaces of the side walls 72—72 vertical positioning grooves 56a′–56b′ which are positioned like and perform the same function as the hopper positioning grooves 56a–56b previously described. Also, the cassette side walls 72—72 are provided with horizontal positioning grooves 62a′–62b′ which are positioned and function like the hopper positioning grooves 62a–62b previously described.

As in the case of the hopper, the forwardly facing cassette side wall 70 has colored markers 65′—66′ positioned to be respectively positioned opposite the projector housing markers 67 and 68 so the cassette can be easily positioned for proper insertion into the projector openings 11 and 38 as above explained in connection with the hopper 12.

When a cassette 14 is placed in the slide chute 31, the upper slide retainer flaps 46″—46″ thereof are folded back as shown in FIGS. 9 and 9A, and the folded-back flaps are passed into clearance grooves 76—76 formed in the front and rear walls of the chute 31. The V-shaped web interconnecting the front slide retainer flap forms an exposed downwardly and inwardly inclined guide shoulder 79 (FIG. 9A) when the flap is folded back, which guide shoulder helps guide the falling slides into the cassette.

Referring to FIGS. 10–17, when either the hopper 12 or cassette 14 is inserted into the slide holder-receiving opening 11, the bottom edges of the side walls 49—49 or 72—72 thereof to which the bottom pair of slide retainer flaps 46—46 or 46′—46′ are releasably held engage the ends of convexly shaped intermediate portions 80—80 of a pair of slide retainer flap pivoting members 82—82 which are pivotally mounted on pivot rods 83—83 below the opposite sides of the holder-receiving opening 11 formed in the top wall 84 of the loading station. Each of the slide retainer flap pivoting members 82 is urged into a normal upper inwardly extending position as best shown in FIG. 14 by a coil spring 86 extending between a stationary portion 87 of the projector housing and the outer margin of the convexly shaped intermediate portion 80 of the member 82 located on one side of the pivot rod 83. The inner margin of the convexly shaped intermediate portion 80 of each slide retainer flap pivoting member 82 projects into the path of movement of one of the side walls 48 or 72 of the hopper or cassette inserted into the opening 11.

Each of the members 82 has adjacent the opposite ends thereof a pair of transversely extending flanges 93—93 which terminate in transversely inwardly extending wings 95—95 which are located outside of the margins of the opening 11 beneath the loading station wall 84. The wings 95—95 are spaced a much greater distance from the pivot rod 83 of the member 82 than the convexly shaped intermediate portion 80 of the member 82 engaged by the side walls of the hopper or cassette involved. Thus, for a given angle of pivot of each member 82, the associated wings 95 will pivot a much greater distance than the convexly shaped intermediate portion 80 thereof.

The wings 95–95 of each member 82 extend to an elevation well above the convexly shaped intermediate portion 80 thereof so that, when the side wall of the hopper or cassette contacts the intermediate portion 80 thereof, the wings 95—95 will be positioned above the transversely inwardly extending bottom slide retainer flaps 46—46 or 46′—46′ as indicated in FIG. 14. As a hopper or cassette is pushed further downwardly into the opening 11, the slide retainer flap pivoting member 82—82 will be pivoted in a clockwise direction as viewed in FIGS. 15–17 against the restraining force of their coil springs 86—86, and the wings 95—95 which were initially out of the path of movement of the slide retainer flap extensions 46b—46b or 46b′—46b′ will engage the extensions as shown in FIGS. 15–17 to pivot the same ultimately into a downwardly and outwardly extending position when the side walls 49—49 or 72—72 engage the upper edges 97—97 of the stop plates 98—98, as shown in FIG. 17. When the force on the hopper or cassette is removed, the springs 86—86 force the convexly shaped intermediate portions 80—80 against the side walls 49—49 or 72—72 of the hopper or cassette to hold the same in its bottommost position in the opening 11. The curved outer surfaces of the intermediate portions 80—80 of the members 82—82 allows the hopper or cassette to be readily pulled upward from the opening 11.

The right angle relationship between the bottom pair of slide retainer flaps 46′—46′ and the upper pair of slide retainer flaps 46″—46″ of the cassette is primarily to simplify the removal of the mold parts from the cassette. FIG. 18 shows these pairs of slide retainer flaps extending outwardly transversely of the side walls of the cassette which is the position thereof when the cassette is removed from the mold.

As previously indicated, the cassette is designed to be used as a transport container for slide transparencies by the film processor as well as a holder of slides in the projector. FIG. 20 shows the cassette 14 filled with slide transparencies 8 by the film processor or customer. In addition to the processed film slides, the processor also incorporates into the cassette a pre-focusing slide 8a which is positioned on the bottom of the stack of processed slides and an identification slide 8b which is positioned on the top of the stack of slides placed in the cassette. The pre-focusing slide 8a may, for example, contain in the central transparency portion of the slide the name of the processor or the trademark 100 of the developer of the cassette and projector system being described, namely the assignee of the invention claimed herein. Also, the transparency portion of the slide preferably contains a set of horizontal lines 102 for focusing the slide.

The identifying slide 8b may, for example, be a thin plate of plastic material which has a rough surface on its upwardly facing side on which surface the customer can write with pen or pencil information identifying the subject matter of the stack of slides involved. Ruled information aligning lines 104 may be provided on the slide 8b. It is preferred that the slide 8b have a portion thereof which is projectable to indicate that the stack of slides has been completely projected. For example, slide 8b may contain indicia openings 106 or transparency portions which can be projected.

It should be understood that numerous modifications may be made in the most preferred form of the invention described above without deviating from the broader aspects thereof.

I claim:
1. A slide holder for a stack of transparency slides in face-to-face relation, said holder comprising: a box-like structure having upstanding side walls defining a slide-receiving channel opening into the bottom of the holder, the sides of the channel forming guides for the transparency slides oriented in planes extending generally transversely to the length of the channel, and a pair of oppositely disposed slide retainer flaps at the bottom of the holder for movement about pivot axes extending parallel to the bottom of the holder between an inwardly extending position where the flaps underlie the bottom of a stack of slides in said channel to hold the same therein, and an outwardly extending position where the slides can fall fully under force of gravity therefrom, and means on said holder for releasably holding said flaps in said inwardly extending position, and said holder having a portion which is sized and shaped as to be mountable upon a slide projector so that the slides will fall into position therein when said flaps are in said outwardly extending position.

2. The slide holder of claim 1 wherein said means for releasably holding said flaps in said inwardly extending position comprises projecting means in one of said flaps and holder side walls and slots in the other of same which frictionally interlock to hold said closure flaps in said inwardly extending position.

3. The slide holder of claim 1 wherein said slide-retainer flaps have portions extending beyond the side walls of said holder so as to be engageable by means in the projector for pivoting the slide-retainer flaps into said outwardly extending position.

4. The holder of claim 1 wherein each of said slide-retainer flaps has a width much less than one-half of the corresponding dimension of the slide-receiving channel in said holder.

5. A cassette for slide transparencies which cassette is useful both as a holder for loading slides into a slide projector and a holder for receiving projected slides in the slide projector, said cassette comprising: a box-like structure having upstanding side walls defining an upstanding slide-receiving channel opening onto the top and bottom of the cassette so slides can be inserted into the top and drop by force of gravity from the bottom of the cassette, the sides of the channel forming guides for a stack of transparency slides in face-to-face relation and oriented in planes extending generally transversely to the length of the channel, a first pair of oppositely disposed slide-retainer flaps at the bottom of the cassette and a second pair of oppositely disposed slide-retainer flaps at the top of the cassette, said first and second pairs of slide-retainer flaps being hinged to opposite side walls of the cassette for movement about pivot axes extending transversely of the length of the channel and between inwardly transversely extending positions where the pairs of flaps can respectively underlie and overlie a stack of slides in said channel to retain the slides therein, and outwardly extending positions where the slides can be dropped into the top of the channel or drop from the bottom of the channel, and means on said holder for releasably holding said first and second pairs of flaps in said inwardly transversely extending positions.

6. The cassette of claim 5 wherein said first and second pairs of slide-retainer flaps are mounted for pivotal movement about respective pairs of axes which are at right angles to one another.

7. The cassette of claim 5 wherein the cassette side walls and said first and second pairs of slide-retainer flaps form a single integral molded body of synthetic plastic material wherein the hinges of said first and second slide retainer flaps are formed by very thin webs of said synthetic plastic material.

8. The cassette of claim 5 wherein said side walls are provided with positioning means for engaging in only one position of the cassette portions of the projector in which it is placed.

9. The cassette of claim 8 wherein said positioning means comprises at least one upstanding groove in the outer surface of a side wall which groove extends from the bottom of said side wall to enable the cassette to be moved downwardly through a projector cassette-receiving opening with a corresponding upstanding rib entering the groove in only one position of the cassette.

10. The cassette of claim 8 wherein said positioning means comprises at least one horizontal groove in the outer surface of a side wall which groove extends from the vertical margin of the side wall to enable the cassette to be moved horizontally through a projector cassette-receiving opening with a corresponding horizontal rib of the projector entering the groove in only one position of the cassette.

11. In a projector: a housing having a slide loading station including a wall with a first slide holder-receiving opening therein for receiving a box-like slide holder containing an upstanding stack of slides, and said projector housing having slide holder engaging means for engaging said holder which holder has movable slide retainer means in the bottom of the holder, said slide holder engaging means including means for engaging said holder slide retainer means and effecting relative movement between the slide retainer means and the holder to open the bottom of the holder where the stack of slides in the holder drops therefrom by force of gravity as the holder is moved into said first slide holder-receiving opening.

12. The combination of claim 11 wherein said projector housing has a slide projection station to which slides are delivered one at a time from the bottom of a stack in the holder positioned within said first holder-receiving opening, said housing further has a slide-receiving chute into which slides are dropped after they are projected at said projection station, said slide-receiving chute opening onto the outside of said housing through a second holder-receiving opening through which a holder identical to that insertable into said first holder-receiving opening can be passed into the chute to receive the slides dropping into said chute.

13. The combination of claim 11 wherein the holder to be inserted therein has a pair of slide retainer flaps initially underlying the slides in the holder, and said slide holder engaging means in said projector housing includes a pivotally mounted member having portions engaged by the slide holder as it is moved into said first slide holder-receiving opening to pivot the same, and other portions which engage said slide-retainer flaps and pivot the same to an outwardly and downwardly extending position as the holder is moved into said first holder-receiving opening.

14. The combination of claim 11 wherein: said first slide holder-receiving opening is in an upwardly facing opening into which a slide holder is moved downwardly into position, and there is combined with said projector a slide holder having an upstanding channel for supporting a stack of slides in face-to-face relation, said slide holder including a pair of opposed slide retainer flaps hinged to the bottom of the holder about horizontal pivotal axes, said opposed slide retainer flaps being initially releasably held in transversely inwardly extending positions for underlying a stack of slides in said holder channel, said slide retainer flaps of said slide holder having extensions which project beyond the side walls of the holder, and said slide holder engaging means of the projector comprises a pair of slide retainer flap pivoting members which are pivotally mounted about axes parallel to the pivot axes of said slide retainer flaps of said slide holder when inserted into said first slide-receiving opening, and each includes first portions spaced from the pivot axes of the same and positioned in the path of downward movement of said slide holder into said first holder-receiving opening to be pivoted thereby and other portions which are spaced a greater distance from the latter pivot axes than said first portions of said slide retainer flap pivoting members and initially out of the path of movement of said slide retainer flap extensions of a slide holder moved down into said opening, and said other portions of each slide retainer flap pivoting member being pivoted downwardly into engagement with said holder slide retainer flap extensions as the holder is moved downwardly into the first slide holder-receiving opening of the projector against said first portions of said slide retainer flap pivoting member, to pivot the slide holder retainer flaps downwardly and outwardly to uncover the bottom of the channel therein.

15. The combination of claim 11 wherein said projector housing includes means for automatically releasably holding the slide holder in position when it is fully inserted into said slide holder-receiving opening.

16. The combination of claim 14 wherein said projector housing includes means for automatically releasably holding the slide holder in position when it is fully inserted into said slide-receiving opening, said holding means including spring means which normally urge said slide retainer flap pivoting members in a position to be in the path of movement of said slide holder as it is moved down into said first slide holder-receiving opening, said spring means, upon release of the slide holder when in a fully inserted position in said opening pushing said first portions of said slide retainer flap pivoting members against the side walls of said holder frictionally to hold the slide holder in place.

17. The combination of claim 16 wherein said first portions of slide retainer flap pivoting members have convexly curved surfaces which engage the side walls of said slide holder when the holder is released in said fully inserted position.

18. The combination of claim 14 wherein said other portions of said slide retainer flap pivoting members are spaced from the pivot axes thereof a much greater distance than are said first portions engaged by said holder, so the retainer flap engaging members pivot a much greater distance than the first portions thereof for a given angle of pivot thereof.

19. In combination, a pair of susbtantially identical cassettes, one of which is filled with a stack of slides and one of which is initially empty, each of said cassettes having upstanding side walls defining a slide-receiving channel extending between the top and bottom of the cassette and forming guides for transparency slides in face-to-face relation and oriented in planes extending generally transversely of the length of the channel, and a movably mounted slide retainer respectively underlying and overlying the open ends of said channel to retain the slides within the cassette; and a slide projector for receiving said cassettes, the projector including a housing having a slide loading station with a first slide holder-receiving opening for receiving said slide filled cassette and a slide receiving station for receiving projected slides and including a second slide holder-receiving opening communicating with a slide chute within the projector into which chute the slides drop by force of gravity after being projected, said second slide holder receiving-opening being adapted to receive said empty cassette which is movable therethrough into position within the slide chute to receive the slides dropping by force of gravity therein, said projector housing including adjacent said first slide holder-receiving opening holder slide retainer pivoting means in the path of movement of the slide filled cassette into said first slide holder-receiving opening and which pivoting means engages the bottom slide retainer of the cassette and moves the same into a position uncovering the bottom of the cassette channel to enable the slides to fall therefrom as the cassette is moved into the latter opening, said empty cassette when inserted through said second slide-receiving opening into said slide chute having the upper slide retainer means thereof pivoted into a position to uncover the top of the channel to enable the slides dropping into the chute to fall into the cassette.

20. The combination of claim 19 wherein said cassettes in said projector housing have interlocking cooperating positioning means for permitting said cassettes to be moved into said first and second slide holder-receiving opening in only one particular orientation thereof so the slides in a properly loaded filled cassette will automatically be projected with a proper orientation, and the slides dropped into the initially empty cassette in said slide chute will be oriented in such a way that the slides will be projected when the initially empty cassette is placed into said first slide holder-receiving opening at the loading station of the projector.

21. The combination of claim 20 wherein said interlocking cooperating positioning means are grooves in one of said projector housing and cassettes and ribs in the other of same which enter the grooves.

22. The combination of claim 21 wherein there is further provided marker means on the projector housing adjacent said first and second slide holder-receiving openings and on said cassettes which markers are positioned in alignment to enable the cooperating positioning means thereof readily to be interlocked.

References Cited

UNITED STATES PATENTS

| | | | |
|---|---|---|---|
| 3,264,937 | 8/1966 | Antos | 353—112 |
| 3,292,801 | 12/1966 | Walz et al. | 298—35 |

HARRY N. HAROIAN, Primary Examiner

U.S. Cl. X.R.

206—62

UNITED STATES PATENT OFFICE
CERTIFICATE OF CORRECTION

Patent No. 3,495,902 February 17, 1970

Edward J. Michniewicz

It is certified that error appears in the above identified patent and that said Letters Patent are hereby corrected as shown below:

Column 10, line 28, "into" should read -- in --.

Signed and sealed this 23rd day of February 1971.

(SEAL)
Attest:

Edward M. Fletcher, Jr.
Attesting Officer

WILLIAM E. SCHUYLER, JR.
Commissioner of Patents